No. 12,132. REISSUED JULY 21, 1903.

H. M. WILLIS.

TOBACCO PIPE.

APPLICATION FILED MAY 2, 1903.

WITNESSES:

Amaziah Whitney.

L. M. Weber

INVENTOR.

Henry M. Willis

BY

James A. Whitney

ATTORNEY.

No. 12,132. Reissued July 21, 1903.

UNITED STATES PATENT OFFICE.

HENRY M. WILLIS, OF EAST WILLISTON, NEW YORK.

TOBACCO-PIPE.

SPECIFICATION forming part of Reissued Letters Patent No. 12,132, dated July 21, 1903.

Original No. 722,343, dated March 10, 1903. Application for reissue filed May 2, 1903. Serial No. 155,444.

*To all whom it may concern:*

Be it known that I, HENRY M. WILLIS, a citizen of the United States, and a resident of East Williston, in the county of Nassau, in the State of New York, have invented certain new and useful Improvements in Tobacco-Pipes; and I do hereby declare that the following is a full, clear, and exact description of the same, reference being had to the accompanying drawings, making a part of this specification, in which—

Figure 1:
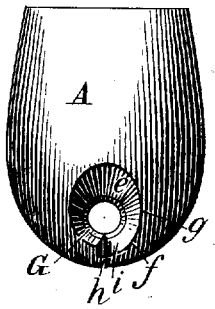
Figure 2:
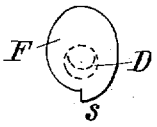
Figure 3:
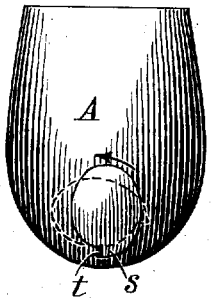
Figure 4:
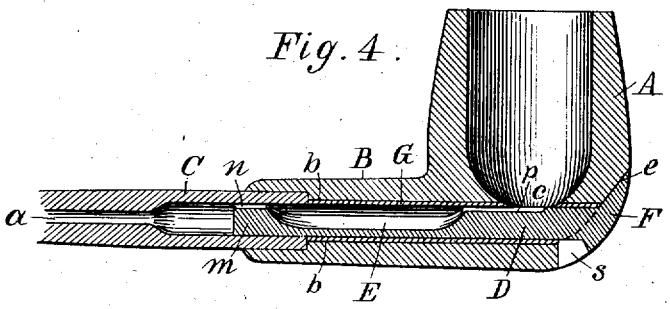
Figure 5:
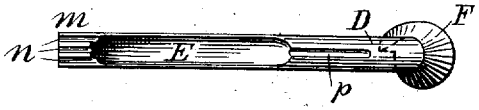

Figure 1 is a face view of the bowl of a tobacco-pipe made according to my invention. Fig. 2 is a face view of one of the parts included in a pipe made according to my invention. Fig. 3 is a face view of the pipe with the part shown separately in Fig. 2 in place in the part shown separately in Fig. 1. Fig. 4 is a vertical longitudinal sectional view of the said pipe. Fig. 5 is a detached top view of the device shown in face view in Fig. 2.

This invention relates to that class of tobacco-pipes in which a removable cleaning device is extended through the base of the bowl and into the part of the stem adjacent thereto.

The object of my invention is to provide for a more effective and convenient operation of the cleaning device than has hitherto obtained in pipes of the general character above indicated, also to insure a more smooth and symmetrical contour to the bowl than has usually been found consistent with the presence of a cleaning device in relation just indicated, and also to prevent the hygroscopic character of the materials of which the pipe-bowls are commonly made from causing the bore through which the cleaning device is passed from binding upon the device, and thereby preventing its satisfactory operation.

With these ends in view my invention comprises certain new and useful combinations of parts hereinafter fully described and particularized.

A is the bowl of a tobacco-pipe. Except as hereinafter specified this bowl may be of any ordinary or desired configuration and of any suitable material. Ordinarily such bowls are made of some variety of wood and one therefore more or less liable to shrink and swell, according to the proportions of moisture to which they are subjected, and to meet the demands of trade or the preferences of purchasers the bowls employed in pipes made according to my invention will in the nature of things be to a greater or less extent of such materials.

B is the enlarged portion of the pipe-stem, made ordinarily integral with the bowl A, and consequently of the same material.

C is the mouthpiece or smaller portion of the pipe-stem, the passage *a* through which is usually of much less diameter than the bore *b* of the part B. This bore *b* communicates at its inner end with the passage *a* of the part C of the pipe-stem and at its forward or outer end opens at the front of the bore, as shown in Figs. 1 and 4. This bore communicates with the interior of the bowl by means of an orifice *c*, as shown in Fig. 4. In the face of the bowl around the forward end or opening of the bore *b* is a cavity *e*, one side or lateral portion of which, as from *f* to *g*, is of a sloping or inclined configuration—in other words, of such conformation as to oppose an arm, hereinafter fully described, in such manner that an axial movement of said arm results in a cam action to start the cleaning device (herein presently shown) from its place, as hereinafter fully appears. The cavity *e* is at one of its edges elongated or extended, as shown at *i*. One side of this notch or extension *i* of the cavity may be sloped, as from *h* to *f*, to form part of the cam-action surface of the cavity.

D is a plug (shown more fully in Figs. 4 and 5 and in dotted outline in Fig. 2) which fits snugly but removably in the outer portion of the bore *b*, into which it is longitudinally thrust. This plug D has at its inner end a semicylindric scoop E, which normally occupies the remaining length of the bore. The inner end *m* of this scoop is for the most part closed; but the interior of the scoop communicates with the passage *a* of the pipe-stem by grooves or openings *n* and at its forward end with the orifice *c* in the bottom of the bowl by a similar groove or opening *p*, as more clearly indicated in Fig. 4. Upon the forward or outer end of the plug D is fast an arm or cam F, the rear surface of which corresponds in relief with the intaglio of the cavity *e* and the outer or forward end of which when the said arm or cam is normally in position is flush with the adjacent outer surface of the bowl. This cam has a spur or projection *s*, which fits into the extension *i* of the cavity and which should at its outer surface be flush with the surface of the bore. A sufficient space *t* should be left at one edge of this spur to permit the insertion of any suitable instrumentality—as, for example, the thumb-nail—to turn the spur, and consequently the cam, (and with them the plug and the scoop,) in the direction of the arrow in Fig. 3, thereby bringing the cam more or less to the position shown in dotted outlines in said figure. The conformations of the surfaces of the cavity and the cam, respectively, are such that when the cam is turned as just mentioned it not only gives an axial movement to the plug and the scoop, but also a longitudinal outward movement to the said plug and scoop, which starts them from their places in the bore of the pipe and causes the plug to project beyond the face of the bowl, so that it may be firmly manipulated to axially turn the scoop to scrape the surface of the bore and to be readily withdrawn from the bore for purposes of examination, cleansing, &c. When the plug and scoop are in place, the proper communication between the bowl and the mouthpiece of the pipe is clear, and the pipe may be used in any ordinary manner, while the continuous or mutually-flush surfaces of the cam and the bowl preserve to the latter its symmetrical contour, unbroken and undisfigured by unsightly projections, at the same time that exceedingly convenient means are provided for actuating the cam to give a compound axial and longitudinal movement to the scoop, which is very effective in promoting the scraping action of the scoop upon the walls of the bore, but also brings the scoop into a position in which it may be even more vigorously operated by a grasp of the fingers upon the cam, which in such case serves as a handle. As impurities from the smoke are deposited either within the spoon-like interior of the scoop or upon the walls of the bore, from which they are scraped by the edges of the scoop during the described movements of the scoop, it follows that most efficient means are thus provided for the cleaning of the pipe when desired, as well as for the arrest of impurities from the smoke between the base of the bowl and the forward end of the mouthpiece of the pipe.

As hereinafter explained, the bowl for commercial reasons or purchasers' preferences will ordinarily be made of wood or like material possessed of more or less hygroscopic properties. I have found that the swelling of the material from excess of moisture causes a diminution in the diameter of the bore *b*, which frequently causes the walls of the bore to bind upon the plug, and thereby greatly impede the requisite movement of the plug and the scoop, hereinbefore set forth. On the other hand, the shrinking of the material by diminution of moisture by enlarging the bore is liable to render the plug too loose therein. To remedy these defects, I make the bore of sufficient size to receive a cylindric brace G, which is preferably of metal and in any event of a non-hygroscopic character. The internal diameter of this brace is of course such as to properly accommodate the plug, which is placed therein, and the scoop, which passes therethrough. The brace G should be so snugly forced into its position in the bore that it will at all times bear strongly against the walls thereof and by resisting their inward thrust maintain the integrity and uniformity of its own internal diameter, and consequently a uniform seat or bearing for the plug.

It will be observed that by reason of the cylindric bearing of the plug in its seat and of the nearly-closed circular inner end of the scoop at the inner end of the bore a very firm and stable support is afforded to the removable plug and its adjuncts when the same are normally in position, as set forth.

What I claim as my invention is—

1. In a tobacco-pipe the combination with a bowl composed of more or less hygroscopic material which has a bore that is open at its outer end and which communicates with the passage of the pipe-stem, and a removable plug arranged in the said bore, of a non-hygroscopic brace inserted in the said bore to restrain the swelling of the material of the bowl upon the plug and thereby prevent the binding of the plug in the bore, as described.

2. In a tobacco-pipe the combination with a bowl composed of more or less hygroscopic material which has a bore that is open at its outer end and which communicates with the passage of the pipe-stem, a removable plug arranged in the said bore, means for manipulating said plug provided at the outer end thereof, and a cleaning-scoop on the inner end of the plug, of a non-hygroscopic brace inserted in the bore to restrain the swelling of the material of the bowl upon the plug and thereby prevent the binding of the plug in the bore, as described.

3. In a tobacco-pipe, the combination with a bowl which has a cylindric bore coincident with the tube or passage of the pipe-stem and an external cavity which communicates with said bore, of a removable plug arranged to turn in said bore, provided at its outer end with a cam which lies in the cavity and works against a surface thereof when turned for the operation of the plug, and a semicylindric scraping-scoop on the inner end of the plug and removable therewith, as described.

4. In a tobacco-pipe, the combination with a bowl which has a cylindric bore coincident with the tube or passage of the pipe-stem and an external cavity which communicates with said bore, of a removable plug which is arranged to turn in said bore and which has at its outer end a cam-like arm arranged to lie in said cavity with its outer surface flush with the adjacent surface of the bowl and to act against a surface of the cavity when the plug is turned to start the latter from the bore, and a semicylindric scoop on the inner end of the plug and movable therewith, as described.

5. In a tobacco-pipe, the combination with a bowl which has a cylindric bore coincident with the tube or passage of the pipe-stem and an external cavity which communicates with said bore and has a more or less curved surface at one of its sides, of a plug arranged to turn in said bore which has a semicylindric scraping-scoop on its inner end and at its outer end a cam-like arm which is arranged to coöperate with the curved surface of the cavity to start the plug from the bore and is provided with a lip or projection whereby the cam may be readily actuated to start the plug from the bore, as described.

6. In a tobacco-pipe, the combination with a bowl composed of more or less hygroscopic material which has a cylindric bore coincident with the tube or passage of the pipe-stem and an external cavity which communicates with said bore, a plug arranged to turn in said bore, a semicylindric scraping-scoop on the inner end of said plug, and an arm at the outer end of said plug arranged to lie in said cavity, of a non-hygroscopic cylindric brace inserted in the said bore to restrain the swelling of the material of the bowl upon the plug and thereby prevent the binding of the plug in the bore, as described.

7. In a tobacco-pipe the combination with a bowl composed of more or less hygroscopic material and which has a cylindric bore coincident with the tube or passage of the pipe-stem and an external cavity which communicates with said bore, of a cylindric non-hygroscopic brace in said bore to maintain a uniform diameter therein, a plug axially and longitudinally movable within said brace, of a semicylindric scraping-scoop on the inner end of the plug, a cam device on the outer end of said plug and arranged to lie in the cavity with its surface flush with the surface of the bowl, and a lip or projection on the cam device arranged to lie in a suitably-provided angular extension of the cavity, as described.

8. In a tobacco-pipe the combination with a bowl which has a cylindric bore coincident with the tube or passage of the pipe-stem, and an external cavity which communicates with said bore, of a removable plug, which is arranged to turn in said bore, which has at its outer end an arm which normally rests in said cavity, which has a semicylindric scraping-scoop, which for the most part is closed at its inner end, and which at its outer end communicates by a longitudinal groove in the plug with an opening in the bottom of the bowl, as described.

9. In a tobacco-pipe the combination with a bowl which has a cylindric bore coincident with the tube or passage of the pipe-stem and an external cam-shaped cavity which communicates with said bore, of a removable plug which is arranged to turn in said bore, which has in its outer end a cam-like arm that normally rests in said cavity with its outer surface flush with the adjacent outer surface of the bowl, and which has a semicylindric scraping-scoop which at its outer end communicates through a groove in the plug with an opening in the bottom of the bowl, and at its inner end with the tube of the pipe-stem through a groove in the otherwise-closed end of the scoop, as described.

HENRY M. WILLIS.

Witnesses:
JAMES A. WHITNEY,
AMAZIAH WHITNEY.